Nov. 12, 1929.         L. R. TITCOMB         1,735,023
LIQUID MEASURING DEVICE
Original Filed Jan. 10, 1925
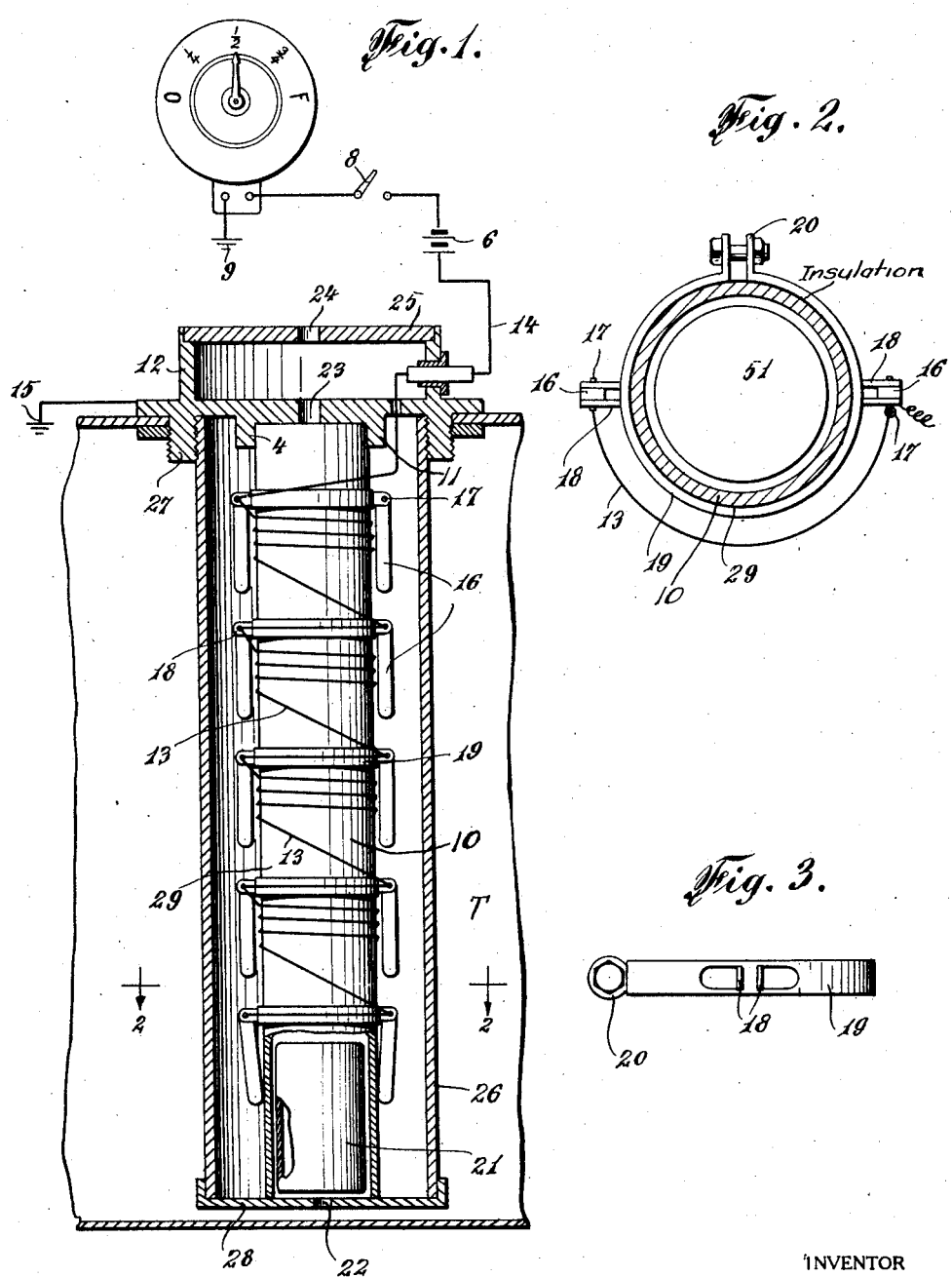
INVENTOR
Lee R. Titcomb Patented Nov. 12, 1929

1,735,023

UNITED STATES PATENT OFFICE

LEE R. TITCOMB, OF BROOKLYN, NEW YORK, ASSIGNOR TO AUTO-METER CO. INC., OF NEW YORK, N. Y., A CORPORATION OF DELAWARE

LIQUID-MEASURING DEVICE

Original application filed January 10, 1925, Serial No. 1,584. Divided and this application filed April 4, 1928. Serial No. 267,261.

This invention relates to means for measuring and electrically indicating the quantity of liquid in a tank, and is particularly adapted for use in connection with motor vehicles to measure and indicate the quantity of gasolene in the usual gasolene storage tank carried by the vehicle, or the quantity of oil in the crank case of the engine constituting the motive power of the vehicle, the present application being for subjects-matter of invention divided from my co-pending application Serial No. 1584, filed Jan. 10, 1925.

It is the object of the present invention to provide an improved constructed and arranged variable electric current regulating or rheostat device adapted to be connected with a source of electricity in circuit with an indicator responsive to electric current strength, means being provided to connect variable amounts of the resistance device into the circuit, which means is controlled by a float to rise and fall with the level of the liquid in a tank containing the liquid to be measured.

The invention relates to a form of rheostat device which is adapted to be mounted in a tank with the resistance element extending from the top to the bottom of the tank with contact makers connected in circuit with different portions of the resistance element, and either one or more of which contact makers are brought into contact with a contact member common to all of the contacts to establish the circuit and thus connect different amounts of the resistance element into the indicator circuit, said contact makers being actuated by means controlled by the rise and fall of a float with the liquid level in the tank, and it is a further object of the invention to provide improved means for mounting a rheostat device of this character in the tank whereby the resistance element and the contact makers are out of contact with the liquid, such as gasolene or oil, in the tank and thus preventing the igniting of said liquid by the creating of an electric arc as the contact makers are moved to circuit making position.

In the drawing accompanying and forming a part of this application Figure 1 is a longitudinal sectional view of my improved electric current flow or rheostat device, showing the same in connection with means for mounting it in a tank containing the liquid to be measured to be controlled by the varying quantity of liquid in the tank while maintaining the electric means out of contact with the liquid, and showing in a diagrammatic manner the electric connection of the device with an indicator.

Figure 2 is a cross sectional view taken on the line 2—2 of Figure 1.

Figure 3 is a side elevation of a mounting for the contact makers to connect different amounts of the resistance element of the rheostat device in the circuit.

I have illustrated an embodiment of the invention in a diagrammatic manner in electrical connection with an electric indicator, shown in a conventional manner at 5, said instrument embodying a dial calibrated to indicate the liquid level in a tank, although it may be calibrated to indicate measure, such as gallons, and relative to which a pointer is movable under the influence of variations in the strength of an electric current, the pointer being normally urged to a certain position by a biasing force. One terminal of the instrument is connected with a source of current supply, such as a battery, shown in a conventional manner at 6, by a conductor 7 which may have a switch 8 interposed therein, the other terminal of the indicator also being connected with the battery by grounding, as shown at 9, and in motor vehicle practice grounded in the vehicle frame.

The electric current flow regulating or rheostat device is arranged to be suspended from an opening in the top of a tank T containing the liquid to be measured to extend to adjacent the bottom, which tank may be the gasolene storage tank of a motor vehicle usually arranged at the rear of the vehicle. The rheostat device comprises a tubular member 10 of non-magnetizable but conducting material, such as brass, fixed at one end centrally to a cap 12 by engaging the end in a boss, as at 11, and secured therein by soldering or otherwise, the cap serving as a support for the rheostat device and a closure for the opening in the tank. The resistance element comprises a coil of insulated wire 13 wound around the tube 10 and having one terminal connected by a conductor 14 with the side of the battery opposite to which the instrument connecting conductor 7 is connected, the opposite terminal of the resistance coil being connected in circuit with the instrument by electrically connecting the same with the tube 10 and grounding it through said tube and cap 12, or the tank, in the vehicle frame, as shown in a conventional manner at 15.

Different amounts of the resistance element or coil are connected in circuit with the indicating instrument by a series of pairs of contact makers 16 electrically connected in series with different portions of the resistance element and adapted to make contact with the tube 10, which tube is a contact common to all the contact makers 16. The contact makers are of magnetizable material pivotally mounted on and in electrical connection with pivot pins 17 mounted in ears 18 extended laterally from carriers in the form of split rings 19 embracing the tube 10 and clamped thereto by a bolt extended through perforations in ears at the ends of said rings, as shown at 20. There are five of these rings equidistantly spaced along the tube 10, and each ring carries a pair of contact makers 16 at diametrically opposite sides thereof and of the tube. The contact makers 16 are electrically connected with different portions of the coil by removing the insulation from a portion of the resistance wire and connecting the bared wire to the pivot pins 17 by looping the wire over said pins and soldering thereto. The contact makers normally assume a position by gravity in parallel relation to and out of contact with the tube 10, and are brought into electrical connection with the tube through the attraction of a magnet 21 within the tube. The tube 10 is in communication with the liquid in the tank at the lower end through a port 22 in the lower closed end thereof, and the magnet is in the nature of a float adapted to rise and fall with the liquid level in the tank and entering the tube is thereby positioned opposite to the contact makers. It will be obvious that as there is an increase in the quantity of liquid in the tank that there will be a corresponding rise of the liquid level in the tube and the buoyancy or pressure of the liquid on the float magnet will position the same accordingly within the tube, the attractive force of the magnet drawing the contact 16 which may be opposite thereto toward and into contact with the tubular member and thus establishing the circuit through that portion of the coil to which the contacts attracted to the tubular member are connected. To relieve the tube 10 above the float of air as the float rises therein said tube above the float is in communication with the atmosphere through a port 23, said port communicating with a recessed portion at the outer side of the closure with which a port 24 in a closure 25 for said recess communicates, the closure with said recess forming a chamber for the connection of the coil with the conductor 14 whereby it is connected with the battery. By the arrangement described any possibility of the float 21 being moved about in the tank with the sloshing of the liquid when the indicating means is utilized in connection with a motor vehicle to indicate the quantity of gasolene in the gasolene tank, and a consequent variable or vibratory movement of the indicator is obviated, with the result that a true reading may be obtained from the indicating instrument as to the quantity of gasolene in the tank. To maintain the coil and contact makers out of contact with the gasolene in the tank and the possible igniting thereof by an arc which may be created by the bringing of the circuit makers 16 into contact with the tube 10 in establishing the electric circuit an enclosing housing is provided for the resistance device, comprising a tubular member 26 having screw threaded connection 27 with the closure cap 12 and the lower end being closed by a closure 28 which also serves to close the lower end of the tubular member 10. The carriers 19 for the circuit makers 16 may be made of insulating material, but when made of conducting material are insulated from the tube 10 by interposing insulating material between the carriers and tube, as shown at 29 in Figure 2.

It will be obvious that various modifications may be made in construction and arrangement of parts, and portions of the invention used without others, and come within the scope of the invention.

Having thus described my invention I claim:

1. In electric current flow regulating means, an electric current resistance element, a tubular carrier of non-magnetizable but conducting material for said resistance element, contacts mounted on and insulated from said carrier and electrically connected to different portions of the resistance element, and a magnet movable within the tubular carrier operative to attract the contacts to said carrier and close the circuit through different portions of the coil and carrier.

2. In electric current flow regulating means, an electric current resistance coil, a tube of non-magnetizable but current conducting material about which the coil is wound, said coil and tube being adapted for connection in circuit with a source of electricity, contacts carried by and insulated from the tube electrically connected to different portions of the coil and normally out of contact with the tube, and a magnet movable within the tube and operative to attract the contacts to the tube to close the circuit and connect different portions of the coil in the circuit.

3. In electric current flow regulating means, an electric current resistance coil, a tube of non-magnetizable but current conducting material about which the coil is wound, one terminal of the coil and the tube being connected to a source of current supply, contact makers carried by and insulated from the tube, said contacts being arranged in equidistant spaced relation along the tube and normally out of contact therewith, a magnet movable within the tube and operative to attract the contacts to the tube to close the circuit of the tube and coil with the source of current supply and connect different portions of the coil into the circuit.

4. In electric current flow regulating means, the combination with a liquid carrying tank, of a tube of non-magnetizable but current conducting material, means to suspend the tube in the tank to extend from the top to adjacent the bottom thereof, said tube being in communication at the lower end with the tank and at the top with the exterior of the tank, an electric current resistance element carried on the exterior of the tube, a source of current supply connected to said tube and one terminal of the resistance element, contact makers carried by and insulated from the tube and normally out of contact therewith, and a magnet movable within the tube adapted to be variably positioned within the tube by the buoyancy of the liquid in the tank entering the tube and by and in accordance with the liquid level in the tank, said magnet being operative to attract the contact makers to the tube and close the circuit through said tube and different portions of the coil.

5. In electric current flow regulating means, the combination with a liquid carrying tank, of a tube of non-magnetizable but current conducting material, means to suspend the tube in the tank to extend from the top to adjacent the bottom thereof, said tube being in communication at the lower and with the liquid in the tank and at the top with the atmosphere exterior of the tank, an electric current resistance coil wound about and insulated from the tube, contact makers pivotally suspended from the tube and out of contact therewith, a source of current supply connected to said tube and one terminal of the resistance coil, a magnet movable within the tube and adapted to be variably positioned within the tube by the buoyancy of the liquid in the tank entering the tube and by and in accordance with the liquid level in the tank and operative to attract the contacts to and close the circuit through the tube and different portions of the resistance coil, and a housing carried by the tube suspending means to enclose the tube with the resistance coil and contact makers carried thereby.

Signed at New York city, in the county of New York and State of New York, this 20th day of March, 1928.

LEE R. TITCOMB.